United States Patent
Joshi et al.

(10) Patent No.: US 10,594,582 B2
(45) Date of Patent: *Mar. 17, 2020

(54) INTROSPECTION DRIVEN MONITORING OF MULTI-CONTAINER APPLICATIONS

(71) Applicant: CA, Inc., Islandia, NY (US)

(72) Inventors: Prabodh Joshi, Islandia, NY (US); Mark Emeis, Islandia, NY (US); James Douglas Engquist, Islandia, NY (US); Dann M. Church, Islandia, NY (US)

(73) Assignee: CA TECHNOLOGIES, INC., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/279,554

(22) Filed: Feb. 19, 2019

(65) Prior Publication Data

US 2019/0190803 A1 Jun. 20, 2019

Related U.S. Application Data

(63) Continuation of application No. 15/472,765, filed on Mar. 29, 2017, now Pat. No. 10,244,034.

(51) Int. Cl.
| | |
|---|---|
| H04L 29/08 | (2006.01) |
| H04L 12/26 | (2006.01) |
| G06F 8/60 | (2018.01) |
| G06F 8/77 | (2018.01) |
| G06F 9/455 | (2018.01) |
| H04L 12/24 | (2006.01) |

(52) U.S. Cl.
CPC ............... *H04L 43/08* (2013.01); *G06F 8/60* (2013.01); *G06F 8/77* (2013.01); *G06F 9/45558* (2013.01); *H04L 41/5035* (2013.01); *H04L 41/5096* (2013.01); *H04L 43/14* (2013.01); *H04L 43/16* (2013.01); *H04L 67/025* (2013.01); *G06F 2009/45591* (2013.01); *G06F 2009/45595* (2013.01); *H04L 41/0816* (2013.01)

(58) Field of Classification Search
CPC ............... H04L 67/025; H04L 41/0816; H04L 41/5096; H04L 41/5035
See application file for complete search history.

(56) References Cited

U.S. PATENT DOCUMENTS

| | | | |
|---|---|---|---|
| 10,244,034 B2 * | 3/2019 | Joshi | H04L 43/08 |
| 2017/0054759 A1* | 2/2017 | Lee | H04L 63/20 |
| 2017/0147319 A1* | 5/2017 | Riek | G06F 8/63 |
| 2017/0279678 A1* | 9/2017 | Kleynhans | H04L 41/0816 |

* cited by examiner

*Primary Examiner* — Kim T Nguyen
(74) *Attorney, Agent, or Firm* — Shook, Hardy & Bacon L.L.P.

(57) ABSTRACT

Provided is a process, including: obtaining a composition record defining at least one service of a multi-container application; selecting a plurality of infrastructure or application performance monitoring agents based on the composition record defining the multi-container application; causing the selected agents to be deployed on one or more computing devices executing the multi-container application; receiving metrics or events from the agents indicative of performance of at least part of the multi-container application or at least some of the one or more computing devices executing the multi-container application; and causing an indication of the received metrics or events to be presented.

20 Claims, 4 Drawing Sheets

INTROSPECTION DRIVEN MONITORING OF MULTI-CONTAINER APPLICATIONS

CROSS-REFERENCE TO RELATED APPLICATION

The present patent is a continuation of U.S. patent application Ser. No. 15/472,765, filed 29 Mar. 2017, having the same title, the entire contents of which is hereby incorporated by reference.

BACKGROUND

Field

The present disclosure relates generally to multi-container application monitoring and, more specifically, to introspection driven monitoring of multi-container applications.

Description of the Related Art

Distributed applications are computer applications implemented across multiple hosts. The group of computers, virtual machines, or containers often each execute at least part of the application's code and cooperate to provide the functionality of the application. Examples include client-server architectures, in which a client computer cooperates with a server to provide functionality to a user. Another example is an application having components replicated on multiple computers behind a load balancer to provide functionality at larger scales than a single computer. Some examples have different components on different computers that execute different aspects of the application, such as a database management system, a storage area network, a web server, an application program interface server, and a content management engine.

The different components of such applications that expose functionality via a network address can be characterized as services, which may be composed of a variety of other services, which may themselves be composed of other services. Examples of a service include an application component (e.g., one or more executing bodies of code) that communicates via a network (or loopback network address) with another application component, often by monitoring network socket of a port at a network address of the computer upon which the service executes.

Often these services are executed within computational entities that provide a standardized interface to underlying computing hardware and isolate the services on the same computing device from one another. Examples include virtual machines and containers. Interfaces provided by these types of computational entities are often consistent across different types of computing hardware, making it often much easier to add and remove computing resources, transition computing resources between different cloud computing providers, and focus developer effort on the functionality and performance of the application. Further, in many cases these computational entities isolate computing environments from one another within the same computing device, facilitating co-tenancy (e.g., with multiple tenants having different accounts and executing code in different virtual machines) on a single computing device and more freedom to scale and allocate computing resources with granularity.

In many cases, due to the standardized interfaces concealing the underlying hardware, and due to the dynamism that they afford, it can be difficult to design and configure software tooling related to distributed applications. For example, designing and configuring monitoring applications that monitor performance of distributed applications or the hardware upon which they execute can be particularly challenging when services of those distributed applications are executed in containers. Containers, through their standardized interfaces, relatively high-frequency provisioning, and isolation between services, can make it difficult to determine which services are in use and available to be monitored and how those services should be monitored.

SUMMARY

The following is a non-exhaustive listing of some aspects of the present techniques. These and other aspects are described in the following disclosure.

Some aspects include a process including: obtaining, with one or more processors, a composition record defining at least one service of a multi-container application, wherein: the multi-container application comprises a plurality of containers configured to run in one or more instances of a container engine executing on one or more computing devices, the containers each contain a respective application component of the multi-container application and respective dependencies of the respective application component, the composition record specifies a respective image identifier or build file-system-path of respective application components that, when executed, implement respective services of the multi-container application, selecting, with one or more processors, a plurality of infrastructure or application performance monitoring agents based on the composition record defining the multi-container application; causing, with one or more processors, the selected agents to be deployed on one or more computing devices executing the multi-container application; receiving, with one or more processors, metrics or events from the agents indicative of performance of at least part of the multi-container application or at least some of the one or more computing devices executing the multi-container application; and causing, with one or more processors, an indication of the received metrics or events to be presented Some aspects include a tangible, non-transitory, machine-readable medium storing instructions that when executed by a data processing apparatus cause the data processing apparatus to perform operations including the above-mentioned process.

Some aspects include a system, including: one or more processors; and memory storing instructions that when executed by the processors cause the processors to effectuate operations of the above-mentioned process.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
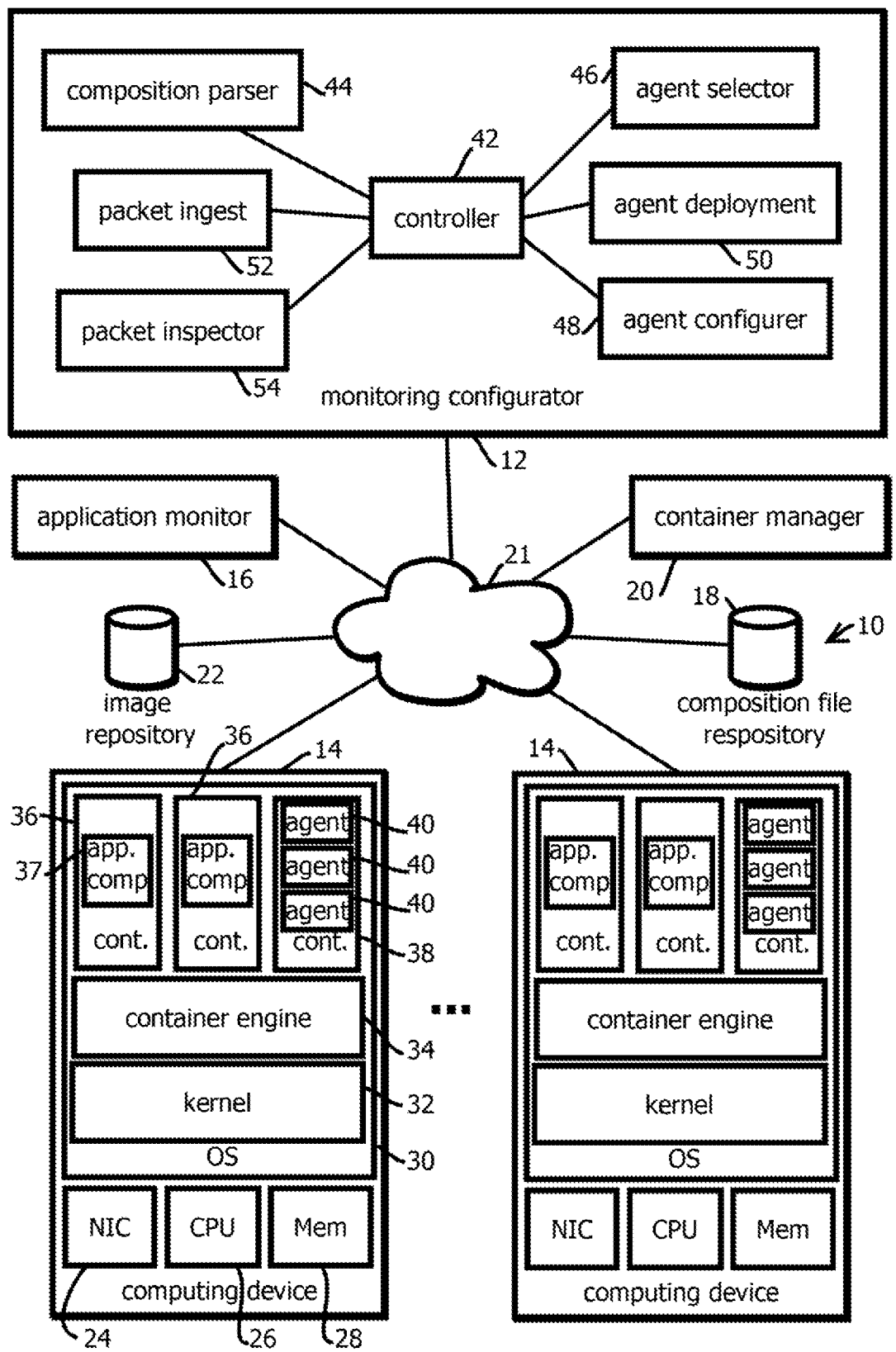
FIG. 1 shows an example of a monitoring configurator 12 operative to add, remove, or configure monitoring agents based on composition files, network traffic, or both, in accordance with some embodiments.

While the present techniques are susceptible to various modifications and alternative forms, specific embodiments thereof are shown by way of example in the drawings and will herein be described in detail. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the field of application and infrastructure monitoring. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

As noted above, often it is difficult to design, implement, and configure monitoring for containerized applications. Such applications often exhibit relatively high dynamism, relatively complex topologies, and relatively high numbers of different types of entities to be monitored. Some embodiments may mitigate these challenges by analyzing compositional records that direct deployment of services in multi-container applications. Some embodiments detect or otherwise infer the appropriate suite of agents and configuration of those agents to monitor the multi-container application based on the analysis of compositional records. Examples of such compositional records include compose files that direct the operation of Docker™ Compose. Compose is a container-management tool for defining and running multi-container Docker applications. With Compose, a user can use a compose file as a script to configure services, networks, and volumes by which a multi-container application is launched and scaled. These can be started when the application is started, in some cases automatically, through a process referred to as orchestration.

Compose introspection, as described below, is a process of analyzing composition records, like Compose files or the other examples described below. Analysis may determine which software is running inside of the application and which containers run which software. For example, if a network port 3306 is defined in a Compose file, this attribute may suggest that the application is using MySQL™ database software. Some embodiments may respond by adding a MySQL-specific, or database specific, agent or agent configurations to one or more of the computing devices executing parts of the multi-container application specified by the Compose file. Thus, introspection driven monitoring may use the analysis of the Compose file, determine which software is running in the application, and add suitable monitoring to the application. Based on which software is running in a given the container, some embodiments deploy the suitable monitoring for that software and start monitoring. Based on introspection driven monitoring, various types of monitoring applications may be configured and deployed.

In some embodiments, these techniques may be implemented in a computing environment 10 (e.g., including each of the illustrated components) shown in FIG. 1 by executing processes described below with reference to FIGS. 2 and 3 upon computing devices like those described below with reference to FIG. 4. In some embodiments, the computing environment 10 may include a monitoring configurator 12, a plurality of computing devices 14, an application monitor 16 of a monitoring application, a composition file repository 18, a container manager 20, and an image repository 22. These components may communicate with one another via a network 21, such as the Internet and various other local area networks.

In some embodiments, the computing environment 10 may execute a plurality of different distributed applications, in some cases intermingling components of these distributed applications on the same computing devices and, in some cases, with some of the distributed applications providing software tools by which other distributed applications are deployed, monitored, and adjusted. It is helpful to generally discuss these applications before addressing specific components thereof within the computing environment 10. In some cases, such applications may be categorized as workload applications and infrastructure applications. The workload applications may service tasks for which the computing environment is designed and provided, e.g., hosting a web-based service, providing an enterprise resource management application, providing a customer-relationship management application, providing a document management application, providing an email service, or providing an industrial controls application, just to name a few examples. In contrast, infrastructure applications may exist to facilitate operation of the workload application. Examples include monitoring applications, logging applications, container management applications, and the like.

In some embodiments, the computing devices 14 may execute a (workload or infrastructure) distributed application that is implemented through a collection of services that communicate with one another via the network 21. Examples of such services include a web server that interfaces with a web browser executing on a client computing device via network 21, an application controller that maps requests received via the web server to collections of responsive functional actions, a database management service that reads or writes records responsive to commands from the application controller, and a view generator that dynamically composes webpages for the web server to return to the user computing device. Some examples have different components on different computers that execute different aspects of the application, such as a database management system, a storage area network, a web server, an application program interface server, and a content management engine. Other examples include services that pertain to other application program interfaces, like services that process data reported by industrial equipment or Internet of things appliances. Often, the number of services is expected to be relatively large, particularly in multi-container applications implementing a microservices architecture, where functionality is separated into relatively fine-grained services of a relatively high number, for instance more than 10, more than 20, or more than 100 different microservices. In some cases, there may be multiple instances of some of the services, for instance behind load balancers, to accommodate relatively high computing loads, and in some cases, each of those instances may execute within different containers on the computing devices as described below. These applications can be characterized as a service composed of a variety of other services, which may themselves be composed of other services. Services composed of other services generally form a service hierarchy (e.g., a service tree) that terminates in leaf nodes composed of computing hardware each executing a given low level service. In some cases, a given node of this tree may be present in multiple trees for multiple root services.

As multi-container applications or other distributed applications have grown more complex in recent years, and the scale of computing loads has grown, many distributed applications have been designed (or redesigned) to use more, and more diverse, services. Functionality that might have previously been implemented within a single thread on a single computing device (e.g., as different sub-routines in a given executable) has been broken-up into distinct services that communicate via a network interface, rather than by function calls within a given thread. Services in relatively granular architectures are sometimes referred to as a "microservice." These microservice architectures afford a number of benefits, including ease of scaling to larger systems by instantiating new components, making it easier for developers to reason about complex systems, and increased reuse of code across applications. It is expected that the industry will move towards increased use of microservices in the future, which is expected to make the above-describe problems even more acute.

Each service is a different program or instance of a program executing on one or more computing devices. Thus, unlike different methods or subroutines within a program, the services in some cases do not communicate with one another through shared program state in a region of memory assigned to the program by an operating system on a single computer and shared by the different methods or subroutines (e.g., by function calls within a single program). Rather, the different services may communicate with one another through network interfaces, for instance, by messaging one another with application program interface (API) commands (having in some cases parameters applicable to the commands) sent to ports and network addresses associated with the respective services (or intervening load balancers), e.g., by a local domain-name service configured to provide service discovery. In some cases, each port and network address pair refers to a different host, such as a different computing device, from that of a calling service. In some cases, the network address is a loopback address referring to the same computing device. Interfacing between services through network addresses, rather than through shared program state, is expected to facilitate scaling of the distributed application through the addition of more computing systems and redundant computing resources behind load balancers. In contrast, often a single computing device is less amenable to such scaling as hardware constraints on even relatively high-end computers can begin to impose limits on scaling relative to what can be achieved through distributed applications.

In some cases, each of the services may include a server (e.g., an executed process) that monitors a network address and port associated with the service (e.g., an instance of a service with a plurality of instances that provide redundant capacity). In some embodiments, the server (e.g., a server process executing on the computing device) may receive messages, parse the messages for commands and parameters, and call appropriate routines to service the command based on the parameters. In some embodiments, some of the servers may select a routine based on the command and call that routine.

The distributed application may be any of a variety of different types of distributed applications, in some cases implemented in one or more data centers. In some cases, the distributed application is a software-as-a-service SaaS application, for instance, accessed via a client-side web browser or via an API. Examples include web-based email, cloud-based office productivity applications, hosted enterprise resource management applications, hosted customer relationship management applications, document management applications, human resources applications, Web services, server-side services for mobile native applications, cloud-based gaming applications, content distribution systems, and the like. In some cases, the illustrated distributed application interfaces with client-side applications, like web browsers via the public Internet, and the distributed application communicates internally via a private network, like a local area network, or via encrypted communication through the public Internet.

As discussed, distributed applications are often relatively complex and difficult for developers and operations engineers to reason about. To help make these applications more manageable, often monitoring applications are installed alongside the distributed application to gather information about the underlying computers upon which the distributed application is executing or performance of application components.

In some cases, the monitoring application may communicate via a different network than that of the distributed application. For instance, the monitoring application may communicate via an out-of-band network in a data center, while the distributed application may communicate via an in-band network. Out-of-band communications are expected to reduce an attack surface of the distributed application by maintaining at least some interfaces of the monitoring application on a network that is not exposed to the public Internet. Or in some cases, these communications may be consolidated on a single network, for instance to simplify the physical architecture.

Two computing devices 14 are shown, but embodiments may have only one computing device or include many more, for instance, numbering in the dozens, hundreds, or thousands or more. In some embodiments, the computing devices 14 may be rack-mounted computing devices in a data center, for instance, in a public or private cloud data center. In some embodiments, the computing devices 14 may be geographically remote from one another, for instance, in different data centers, and geographically remote from the other components illustrated, or these components may be collocated (or in some cases, all be deployed within a single computer).

In some embodiments, the network 21 includes the public Internet and a plurality of different local area networks, for instance, each within a different respective data center connecting to a plurality of the computing devices 14. In some cases, the various components may connect to one another through the public Internet via an encrypted channel. In some cases, a data center may include an in-band network through which the data operated upon by the application is exchanged and an out-of-band network through which infrastructure monitoring data is exchanged. Or some embodiments may consolidate these networks.

In some embodiments, each of the computing devices 14 may execute a variety of different routines specified by installed software, which may include workload application software, monitoring software, and an operating system. The monitoring software may monitor, and, in some cases manage, the operation of the application software or the computing devices upon which the application software is executed. Thus, the workload application software does not require the monitoring software to serve its purpose, but with the complexity of modern application software and infrastructure, often the monitoring software makes deployments much more manageable and easy to improve upon.

In many cases, the application software is implemented with different application components executing on the different hosts (e.g., computing devices, virtual machines, or containers). In some cases, the different application components may communicate with one another via network messaging, for instance, via a local area network, the Internet, or a loopback network address on a given computing device. In some embodiments, the application components communicate with one another via respective application program interfaces, such as representational state transfer (REST) interfaces, for instance, in a microservices architecture. In some embodiments, each application component includes a plurality of routines, for instance, functions, methods, executables, or the like, in some cases configured to call one another. In some cases, the application components are configured to call other application components executing on other hosts, such as on other computing devices, for instance, with application program interface request including a command and parameters of the command. In some cases, some of the application components may be identical to other application components on other hosts, for instance, those provided for load balancing purposes in order to concurrently service transactions. In some cases, some of the application components may be distinct from one another and serve different purposes, for instance, in different stages of a pipeline in which a transaction is processed by the distributed application. An example includes a web server that receives a request, a controller that composes a query to a database based on the request, a database that services the query and provides a query result, and a view generator that composes instructions for a web browser to render a display responsive to the request to the web server. Often, pipelines in commercial implementations are substantially more complex, for instance, including more than 10 or more than 20 stages, often with load-balancing at the various stages including more than 5 or more than 10 instances configured to service transactions at any given stage. Or some embodiments have a hub-and-spoke architecture, rather than a pipeline, or a combination thereof. In some cases, multiple software applications may be distributed across the same collection of computing devices, in some cases sharing some of the same instances of application components, and in some cases having distinct application components that are unshared.

With the complexity that can arise in distributed applications, it can be difficult to diagnose application performance issues or infrastructure issues. Accordingly, some embodiments include monitoring software. The monitoring software may be distinct types that, while they each perform monitoring, perform functions recognized as in industry as being in distinct product categories traditionally. Examples include infrastructure monitoring and application performance monitoring. The former can be analogized to the diagnostic software used by an automotive mechanic to monitor a car's engine, while the latter can be analogized to GPS navigation software by which a car's direction and speed is tracked. Both relate to the operation of the car, but they are distinct categories of software. A similar relationship exists for application performance monitoring and infrastructure monitoring applications. Commercial examples of each include the following.

CA Unified Infrastructure Management (UIM)™ available from CA, Inc. of Islandia, N.Y. may be used to monitor and manage data center deployments and, in particular, those in a multi-tenancy use case, like in the enterprise cloud (e.g., Amazon Web Services™ or Azure™). Some implementations automatically discover computing devices, gather metrics (like CPU usage, memory usage, network activity, etc.) and alarms about the devices, and some implementations aggregate the data in various dashboards and reports. In some cases, this data is gathered and reported to a central server by an agent installed on monitored devices. An administrator console may be used to manually configure and deploy the monitoring agents, also called robots, which may be configured to have "probes," or collections of code configured to monitor a particular type of software. Such probes may be characterized as agents in and of themselves more generally.

CA Application Performance Management (APM)™ available from CA, Inc. of Islandia, N.Y. may be used to monitor the performance of applications by providing fine-grained response times (and other metrics) attributable to portions of a call graph of the application (e.g., indicating which method, of the application called is servicing a request or is running particularly slow). In some cases, this is done by instrumenting the monitored code. An agent may execute on the computing device to receive signals from instrumented code or otherwise monitor the code through operating system interfaces. Embodiments may aggregate such data and present transaction traces that indicate the amounts of time consumed in servicing a user request attributable to various methods and services called when preparing the response to the request.

CA Application Delivery Analysis™ (ADA) available from CA, Inc. of Islandia, N.Y. may also be used to monitor the performance of software, e.g., providing fine-grained measures response time viewed through the lens of network infrastructure. A developer or engineer may use CA ADA to determine that one of 50 servers in distributed system is responsible for a slowdown in a particular application feature for a subset of users. ADA may operate on layer 4 of the OSI model, often the transport layer. By monitoring layer 4 network exchanges, ADA may infer the as-built topology of a distributed application (e.g., what hosts are in a topology (and how they connect in the topology) and where there is redundancy in the topology). Often these topologies have one or more entry hosts (e.g., a web or API server) and a set of downstream hosts that perform back-end processes (e.g., controllers, databases, load balancers, servers that interface with third party API's, etc.).

The illustrated application monitor 16 may be a centralized server that controls various types of monitoring applications. In some embodiments, the infrastructure monitoring software may be a distributed infrastructure management application that includes a centralized infrastructure application monitor that consolidates information and controls agents and infrastructure agents installed on the computing devices 14. In some embodiments, the infrastructure agent may be installed on networking equipment as well, for instance, on switches and routers. Or some embodiments are partially or entirely agentless, and metrics, events, and attributes may be gathered with the various protocols described below for this purpose.

In some embodiments, the infrastructure agent is configured to gather attributes of the computing host upon which the infrastructure agent executes, such as a host name (or other type of host identifier), a network address, a medium access control address, a domain name service, a data center identifier, a data center region, a processor model, a processor speed, amounts of processor memory of various types of cache (e.g. L1 and L2), an operating system name, an operating system version, operating system configurations, firmware names, firmware versions, driver names, driver versions, installed application names, installed application versions, amounts of memory available in random access memory, memory speed, amounts of persistent storage available, persistent storage speed, and the like. In some embodiments, the infrastructure agent is configured to gather metrics of the host upon which the infrastructure agent executes, for instance, processor utilization, memory utilization, temperature, network bandwidth, network latency, rates of packet loss on networks, and the like. In some embodiments, the infrastructure agent is configured to gather events, such as alarms, indicative of occurrences at the host upon which the infrastructure agent executes, for instance, instances of the above metrics crossing (or changing faster than) a threshold, operating system errors, crashes, reboots, corrupted memory being detected, and the like.

In some embodiments, the infrastructure agent may be configured to report such gathered information to a centralized infrastructure monitor (such as application monitor 16), for instance, periodically, and buffer the information between reports. In some embodiments, the infrastructure agent may be configured to receive requests for such information from the infrastructure monitor and respond with responsive information, for instance, all information buffered, or information responsive to a query from the infrastructure monitor.

In some embodiments, the infrastructure agent may include a plurality of "probes," which may be routines configured to gather information pertaining to a particular use case for the host, for example, probes configured to gather information about databases, email servers, web servers, and the like. In some embodiments, some infrastructure agents may have a plurality of probes and a different infrastructure agents may have different pluralities of probes. Or in other architectures consistent with the present techniques, each "probe" may be characterized as an agent, e.g., a single host may have multiple specialized infrastructure or application performance monitoring agents.

In some use cases, system administrators do not have a way to easily take inventory of the computing devices upon which a given distributed application or plurality of distributed applications execute. Often computing devices or hosts executing thereon, are added and removed relatively frequently, often over diverse geographic areas, in some cases automatically responsive to changes in the applied load or crashes or maintenance elsewhere in the system. To ease this burden, some embodiments of the infrastructure monitor (such as application monitor 16) are configured to automatically discover newly added hosts within a domain, for instance, new virtual machines that were added or new computing devices that were added. In some cases, the infrastructure monitor may periodically, or in response to a command, scan a range of network addresses, like in a private subnet, with request sent according to various network management protocols, like Simple Network Management Protocol (SNMP), Windows Management Instrumentation (WMI), or Internet Control Message Protocol (ICMP). If a computing device is not at a given address in the range, no response may be received within a threshold duration of time, and that address may be disregarded. In contrast, a new computing device or other host at a given address, upon receiving the network management protocol request may respond to the request, indicating the presence of a host. Upon detecting a new host, some embodiments of the infrastructure monitor may direct the host to install an instance of the infrastructure agent and, in some cases, configure various probes thereon based upon a role indicated by the host.

In some embodiments, the infrastructure monitor may receive information reported from the infrastructure agents and generate various dashboards, reports, and alarms based on this information. In some embodiments, the infrastructure monitor is further configured to automatically take remedial action, for instance, provisioning additional computing devices responsive to thresholds being exceeded, like thresholds indicating CPU or memory usage greater than a threshold amount. In some embodiments, the infrastructure monitor may organize the received information according to an identifier of a host upon which the infrastructure agent reporting the information is executing. Based upon discovered hosts, and in some cases information reported by those hosts, some embodiments of the infrastructure monitor may construct a network-architecture topology of a physical architecture of computing devices within a domain. In some cases, this network-architecture topology may include network-architecture host identifiers for each of the hosts that were discovered or otherwise identified (for instance, manually identified and configured by a system administrator). In some cases, these host identifiers may be specified by a system administrator, or in some cases, the host itself.

In some embodiments, as discussed above, the monitoring software further includes application performance management software. For example, some embodiments may include a distributed application performance management application including the application monitor 16 and an application agent (or plurality of application agents) executing on the computing devices 14. In some embodiments, the application agents may be configured to monitor performance of an associated application component, e.g., executing on the same computing device 14. Monitoring performance may take a number of forms, and examples include measuring response times of various routines of the application component, for instance, durations of times elapsed between when a given routine is called and when the given routine returns a response. Other examples include gathering errors thrown by routines. In some embodiments, routines may be instrumented by adding calls to the application agent at the beginning and ends of the routines, such that the application agent receives a signal when a given routine in a given execution instance begins and ends, and the application agent may determine response times based on the signals by subtracting the time at which the begin signal was received from the time at which the end signal was received. In some embodiments, these routines may receive such signals from an operating system of a host. In some cases, the application agent and application component may be configured before both are installed on a computing device. For instance, code for the application component may be instrumented with calls to the application agent before that code is installed in a machine image or the computing device 14 that receives that machine image.

In some embodiments, the application agent may gather attributes, metrics, and events of application components and report that gathered information to the application monitor 16, for instance, buffering the information and sending it periodically or sending the information responsive to queries. In some embodiments, the application monitor 16 may aggregate information gathered from a plurality of application agents executing on the computing devices 14 for a given distributed application and generate various dashboards, reports, and alarms. In some embodiments, the application monitor 16 may be configured to group reported metrics according to a given transaction serviced by the distributed application. For instance, a given website request and the chain of events in a pipeline by which the given website request is serviced is an example of a transaction. In many cases, the distributed application may service a relatively large number of transactions concurrently, for instance, after a relatively large number of users make requests at around the same time. Some embodiments may be configured to, for a given transaction, determine a total response time for the transaction, for instance, as perceived by a user, indicating a difference in time between when a request was received and when a response was provided for a user. Further, some embodiments may be configured to segment that response time for the transaction according to the contribution of each of the application components and routines therein. The various reports analyses, and dashboards described herein may be formed by instructing a computing device to render a graphical user interface depicting the same, for instance, by sending instructions to a web browser on a remote computing device or instructing a display of a computing device upon which the respective monitor 16 or 18 is executing. Thus, in some cases, a developer may be able to query the application monitor 18 for particularly slow transactions (or transactions for which an error occurred) and drill down into the particular application component and routine that contributed to the slow response or error.

Some embodiments may include multiple types of monitoring applications, e.g., with multiple respective application monitors 16 and agents co-hosted on computing devices 14. Or some embodiments may include a single type of monitoring application. Thus, in some embodiments, the computing environment 10 may execute a distributed application and a monitoring application on a plurality of computing devices 14. As a result, in some cases, each of the computing devices 14 may be configured to implement different portions of the applications.

In some embodiments, the computing devices 14 and each include a network interface 24, a central processing unit 26, and memory 28. Examples of these components are described in greater detail below with reference to FIG. 4. Generally, the memory 28 may store a copy of program code that when executed by the CPU 26 gives rise to the software components described below. In some embodiments, the different software components may communicate with one another or with software components on other computing devices via a network interface 24, such as an Ethernet network interface by which messages are sent over a local area network, like in a data center or between data centers. In some cases, the network interface 24 includes a PHY module configured to send and receive signals on a set of wires or optical cables, a MAC module configured to manage shared access to the medium embodied by the wires, a controller executing firmware that coordinates operations of the network interface, and a pair of first-in-first-out buffers that respectively store network packets being sent or received.

In some embodiments, each of the computing devices 14 executes one or more operating systems 30, in some cases with one operating system nested within another, for instance, with one or more virtual machines executing within an underlying base operating system. In some cases, a hypervisor may interface between the virtual machines and the underlying operating system, e.g., by simulating the presence of standardized hardware for software executing within a virtual machine.

In some embodiments, the operating systems 30 include a kernel 32. The kernel may be the first program executed upon booting the operating system. In some embodiments, the kernel may interface between applications executing in the operating system and the underlying hardware, such as the memory 28, the CPU 26, and the network interface 24. In some embodiments, code of the kernel 32 may be stored in a protected area of memory 28 to which other applications executing in the operating system do not have access. In some embodiments, the kernel may provision resources for those other applications and process interrupts indicating user inputs, network inputs, inputs from other software applications, and the like. In some embodiments, the kernel may allocate separate regions of the memory 28 to different user accounts executing within the operating system 30, such as different user spaces, and within those user spaces, the kernel 32 may allocate memory to different applications executed by the corresponding user accounts in the operating system 30.

In some embodiments, the operating system 30, through the kernel 32, may provide operating-system-level virtualization to form multiple isolated user-space instances that appear to an application executing within the respective instances as if the respective instance is an independent computing device. In some embodiments, applications executing within one user-space instance may be prevented from accessing memory allocated to another user-space instance. In some embodiments, filesystems and file system name spaces may be independent between the different user-space instances, such that the same file system path in two different user-space instances may point to different directories or files. In some embodiments, this isolation and the multiple instances may be provided by a container engine 34 that interfaces with the kernel 32 to effect the respective isolated user-space instances.

In some embodiments, each of the user-space instances may be referred to as a container. In the illustrated embodiment three containers 36 and 38 are shown, but embodiments are consistent with substantially more, for instance more than 5 or more than 20. In some embodiments, the number of containers may change over time, as additional containers are added or removed. A variety of different types of containers may be used, including containers consistent with the Docker™ standard and containers managed by the Google Kubernetes™ orchestration tooling. Containers may run within a virtual machine or within a non-virtualized operating system, but generally containers are distinct from these computational entities. Often, virtual machines emulate the hardware that the virtualized operating system runs upon and interface between that virtualized hardware and the real underlying hardware. In contrast, containers may operate without emulating the full suite of hardware, or in some cases, any of the hardware in which the container is executed. As a result, containers often use less computational resources than virtual machines, and a single computing device may run more than four times as many containers as virtual machines with a given amount of computing resources.

In some embodiments, multiple containers may share the same Internet Protocol address of the same network interface 24. In some embodiments, messages to or from the different containers may be distinguished by assigning different port numbers to the different messages on the same IP address. Or in some embodiments, the same port number and the same IP address may be shared by multiple containers. For instance, some embodiments may execute a reverse proxy by which network address translation is used to route messages through the same IP address and port number to or from virtual IP addresses of the corresponding appropriate one of several containers.

In some embodiments, various containers 36 and 38 may serve different roles. In some embodiments, each container may have one and only one thread, or sometimes a container may have multiple threads. In some embodiments, the containers 36 may execute application components 37 of the distributed application being monitored, and the container 38 may execute agents 40 of the monitoring application. In some embodiments, each of the application components 37 corresponds to an instance of one of the above-describe services. And in some embodiments, the agents 40 may correspond to one of the above-described types of agents. In some embodiments, a single agent may have multiple configurable probes corresponding to the plurality of agents 40 shown in FIG. 1. In some embodiments, some of the agents 40 may monitor the computing device 14, for instance, gathering metrics about CPU usage, memory usage, bandwidth usage, and the like. In some embodiments, some of the agents 40 may monitor corresponding ones of the application components 37. For instance, an agent may correspond to a particular type of server, like an Apache Tomcat™ server, and that agent 40 may monitor the corresponding server and the corresponding container. Similar application component specific mappings may apply to a variety of other types of services, like those described above.

In some embodiments, the container 38 may run as a privileged container to facilitate access to the host operating system and the process IDs and address space of the other containers 36, thereby bypassing certain security features of containers to facilitate more granular monitoring. In some cases, the host may be a virtual machine executing on the computing device, thereby facilitating use of public clouds in which potentially different virtual machines from different user accounts are executing on the same computing device.

In some embodiments, infrastructure applications in the computing environment 10 may be configured to deploy and manage the various distributed applications executing on the computing devices 14. In some cases, this may be referred to as orchestration of the distributed application, which in this case may be a distributed application implemented as a multi-container application in a microservices architecture or other service-oriented architecture. To this end, in some cases, the container manager 20 (such as an orchestrator) may be configured to deploy and configure containers by which the distributed applications are formed. In some embodiments, the container manager 20 may deploy and configure containers based on a description of the distributed application in a composition file in the composition file repository 18.

The container manager 20, in some embodiments, may be configured to provision containers with in a cluster of containers, for instance, by instructing a container engine on a given computing device to retrieve a specified image (like an ISO image or a system image) from the image repository 22 and execute that image thereby creating a new container. Some embodiments may be configured to schedule the deployment of containers, for instance, according to a policy. Some embodiments may be configured to select the environment in which the provisioned container runs according to various policy stored in memory, for instance, specifying that containers be run within a geographic region, a particular type of computing device, or within distributions thereof (for example, that containers are to be evenly divided between a West Coast and East Coast data center as new containers are added or removed). In other examples, such policies may specify ratios or minimum amounts of computing resources to be dedicated to a container, for instance, a number of containers per CPU, a number of containers per CPU core, a minimum amount of system memory available per container, or the like. Further, some embodiments may be configured to execute scripts that configure applications, for example based on composition files described below.

Some embodiments of the container manager 20 may further be configured to determine when containers have ceased to operate, are operating at greater than a threshold capacity, or are operating at less than a threshold capacity, and take responsive action, for instance by terminating containers that are underused, re-instantiating containers that have crashed, and adding additional instances of containers that are at greater than a threshold capacity. Some embodiments of the container manager 20 may further be configured to deploy new versions of images of containers, for instance, to rollout updates or revisions to application code. Some embodiments may be configured to roll back to a previous version responsive to a failed version or a user command. In some embodiments, the container manager 20 may facilitate discovery of other services within a multi-container application, for instance, indicating to one service executing in one container where and how to communicate with another service executing in other containers, like indicating to a web server service an Internet Protocol address of a database management service used by the web server service to formulate a response to a webpage request. In some cases, these other services may be on the same computing device and accessed via a loopback address or on other computing devices.

In some embodiments, the composition file repository 18 may contain one or more composition files, each corresponding to a different multi-container application. In some embodiments, the composition file repository is one or more directories on a computing device executing the container manager 20. In some embodiments, the composition files are Docker Compose™ files, Kubernetes™ deployment files, Puppet™ Manifests, Chef™ recipes, or Juju™ Charms. In some embodiments, the composition file may be a single document in a human readable hierarchical serialization format, such as JavaScript™ object notation (JSON), extensible markup language (XML), or YAML Ain't Markup Language (YAML). In some embodiments, the composition file may indicate a version number, a list of services of the distributed application, and identify one or more volumes. In some embodiments, each of the services may be associated with one or more network ports and volumes associated with those services.

In some embodiments, each of the services may be associated with an image in the image repository 22 that includes the application component and dependencies of the application component, such as libraries called by the application component and frameworks that call the application component within the context of a container. In some embodiments, upon the container manager 20 receiving a command to run a composition file, the container manager may identify the corresponding repositories in the image repository 22 and instruct container engines 34 on one or more of the computing devices 14 to instantiate a container, store the image within the instantiated container, and execute the image to instantiate the corresponding service. In some embodiments, a multi-container application may execute on a single computing device 14 or multiple computing devices 14. In some embodiments, containers and instances of services may that be dynamically scaled, adding or removing containers and corresponding services as needed, in some cases, responses to events or metrics gathered by a monitoring application.

As noted above, in some cases, it can be relatively time-consuming and complex to deploy and configure the monitoring applications for a multi-container application. To mitigate this challenge, in some embodiments, the monitoring configurator 12 may be operative to automatically infer the appropriate agents 40 to be deployed and configure those agents, either entirely or partially. In some embodiments, the inference may be based upon a composition file describing a distributed application, as described in greater detail below with reference to FIG. 2. In some embodiments, the inference may be based upon inspection of network traffic sent to the network interfaces 24, as described in greater detail below with reference to FIG. 3.

In some embodiments, the monitoring configurator 12 includes a controller 42, a composition parser 44, an agent selector 46, an agent configurer 48, an agent deployment module 50, a packet ingest module 52, and a packet inspector 54. In some embodiments, the operation of each of these components may be directed by the controller 42, which may route information received by the monitoring configurator 12, including commands, to the appropriate component and information between components, as well as directing the operation of the components to implement the processes described below. In some embodiments, the monitoring configurator 12 may be executed on a single computing device, for instance, in one of the above-described containers or virtual machines or operating systems. In some embodiments, the monitoring configurator 12 may be a component of the application monitor 16 or a portion of a distributed monitoring application or a portion of the container manager 20. In some embodiments, the monitoring configurator 12 may be a multi-container or multi-computing device distributed application in and of itself.

In some embodiments, the composition parser 44 may be operative to retrieve a specified composition file (e.g., responsive to a user request or an API call) in the composition file repository 18 and parse that file to detect various tokens indicative of the relevance of certain agents or agent configurations. In some embodiments, the composition parser 44 may parse a composition file into a set of services specified by the composition file and associate the services in program state with attributes of the services, like those described above, such as port number, service name, resource addresses, and the like.

In some embodiments, the data structure produced by the composition parser 44 listing the services may be sent to the agent selector 46, which may be configured to select agents based on the identified services and their attributes. In some embodiments, agents may be selected according to a variety of different rules, for instance, in a rules repository, by a rules engine executed by the agent selector 46

In some embodiments, the agent selector may be configured to select an agent based on an identifier, such as a name, of the service. Some embodiments may select an agent based on a label attribute of a service. For example, some embodiments may compare the value mapped to a label attribute to a plurality of label patterns, each label pattern corresponding to a different agent. Examples of label patterns include a dictionary of n-grams indicative of an agent or a regular expression or set of regular expressions indicative of text by which certain services are often described.

In some embodiments, the agent selector may be configured to select an agent based on dependencies of a service that are among the attributes of a service passed by the composition parser 44. For example, each agent may be associated with a pattern specifying a list of dependencies and values for each of those dependencies indicating whether they are optional or indicating relationships between the dependencies. For example, a group of three of five dependencies may be associated with a value indicating that at least one of the three of the five dependencies must be included for the pattern to match for a given agent, while the other two of the five dependencies may be associated with a value indicating that both of the other two dependencies must match for the pattern of the agent.

In some embodiments, agents may be selected by a group to which a given service is added within the composition file. Such groups may be among the attributes for a given service parsed by the composition parser 44. In some embodiments, techniques like those described above for pattern matching against labels may be applied to group names for various agents. For instance, a group name of "database" may indicate a potential match for four agents each associated with a different database management system. (Other patterns may narrow this list based on other types of matches.)

In some embodiments, a name or path of an image (e.g., an ISO image, like a file or directory containing application code or code for dependencies of the application) may be pattern matched by the agent selector 46 to various agents. In some embodiments, each of the agents may be associated with an image pattern that, upon matching, causes a corresponding agent to be selected. In some embodiments, these patterns may match to each segment of a string separated by delimiter in the path of an image, for instance, against each of several directory names in a path separated by "/" symbols. In some embodiments, such patterns may match against a subset of the segments of the string, for instance, the last two or the second from last segment of a string separated from other segments by such delimiters.

In some embodiments, agents may be selected based on a network mode specified, for instance, a value indicating whether the network mode is bridge, host, none, a service name, or a container name. For service and container names, techniques like those described above with reference to label pattern matching may be applied for various agents. Similar techniques may be applied to an alias attribute of a service.

In some embodiments, agents may be selected based on volume names or paths specified in the composition file. Techniques like those described above for image path pattern matching may be applied to select various agents based on these strings.

In some embodiments, agents may be selected based on port numbers mapped to services by the composition file. For example, each agent may have associated therewith a list or range of port numbers associated with the agent, and upon a service being assigned one of those port numbers by the composition file, the corresponding agent may be selected.

In some embodiments, the various above rules may be combined, for instance, in a hierarchy or branching arrangement of rules, like "if rule X is true and not rule Y, then select agent Z." In some embodiments, a given rule may yield a plurality of candidates, and another rule may narrow the list of candidates. In some embodiments, the rules may be combined with a weighted score, for instance, the set of rules may output a set of binary vectors, one for each candidate agent, having scalars indicating which rules yielded a true value and which rules yielded a false value for the respective candidate agent. Some embodiments may transform the vectors into a score for each candidate agent, for instance, with a weighted combination of the values of the vector formed by taking the inner product of the candidate agent vector and a weight vector (having values assigning weights to the outcomes of each of the rules), and those agents having greater than a threshold score may be selected.

Some embodiments may include an agent configurer 48 operative to configure agents based on the output of the composition parser 44. Configured agents may include agent selected by the agent selector 46 and agents manually specified by the user. In some embodiments, each agent may be associated with a plurality of different configurations that the agent configurer 48 may select among based on pattern matching like that described above for the agent selector 46. In some embodiments, each candidate configuration may be associated with a set of rules like those discussed above or various hierarchies or combinations of weightings of rules. For example, the agent configurer 48 may determine to adjust a threshold for an alarm, add or remove metrics being monitored, add or remove events to be reported, change monitoring frequency, change reporting frequency, or the like.

In some embodiments, the agent deployment module 50 may be operative to receive the selected agents (or agent specified by the user) and the configurations from the agent configurer 48 (or default configurations) and cause the corresponding agents to be deployed. Causing deployment may include sending an instruction to the application monitor 16 or to the container manager 20 that causes the selected agents to be deployed, the configurations to be applied, or configurations to be changed on existing agents. Causing deployment does not require that the entity causing deployment itself implement the deployment.

In some embodiments, the multi-container application may include containers or services therein that are not identified by the agent selector 46 or manually by the user, but which a user may still wish to monitor. In some embodiments, the need for, or for configuration of, such agents may be inferred based on observation of network traffic. Some embodiments may monitor attributes of headers in network traffic and attributes of payloads of network traffic and infer based on this information that a given service is running within a container. Or some embodiments may infer that a given service has a given configuration within the container. Based on one or more of these inferences, some embodiments may cause agents to be deployed or an agent to be reconfigured. In some embodiments, these adjustments may be effected by executing a process described below with reference to FIG. 3.

To implement these processes, some embodiments may include a packet ingest module 52, which may receive collections of packets of network traffic, and a packet inspector 54, which may match patterns to the network traffic to determine which agents are to be added or which configurations are to be changed or applied. In some embodiments, the packet ingest module 52 or the packet inspector 54 may be executed within the container 38 or within the monitoring configurator 12 (or portions of one or both may be executed across the components, e.g., with the ingest module in the container 38 and the inspector 54 having components both in the container 38 and the monitoring configurator 12). Responsive to the output of these modules, the agent deployment module 50 may take responsive action like that described above. Network traffic pattern matching is described in greater detail below with reference to FIG. 3, after describing operations by which monitoring is configured according to a composition file in FIG. 2.

Figure 2:
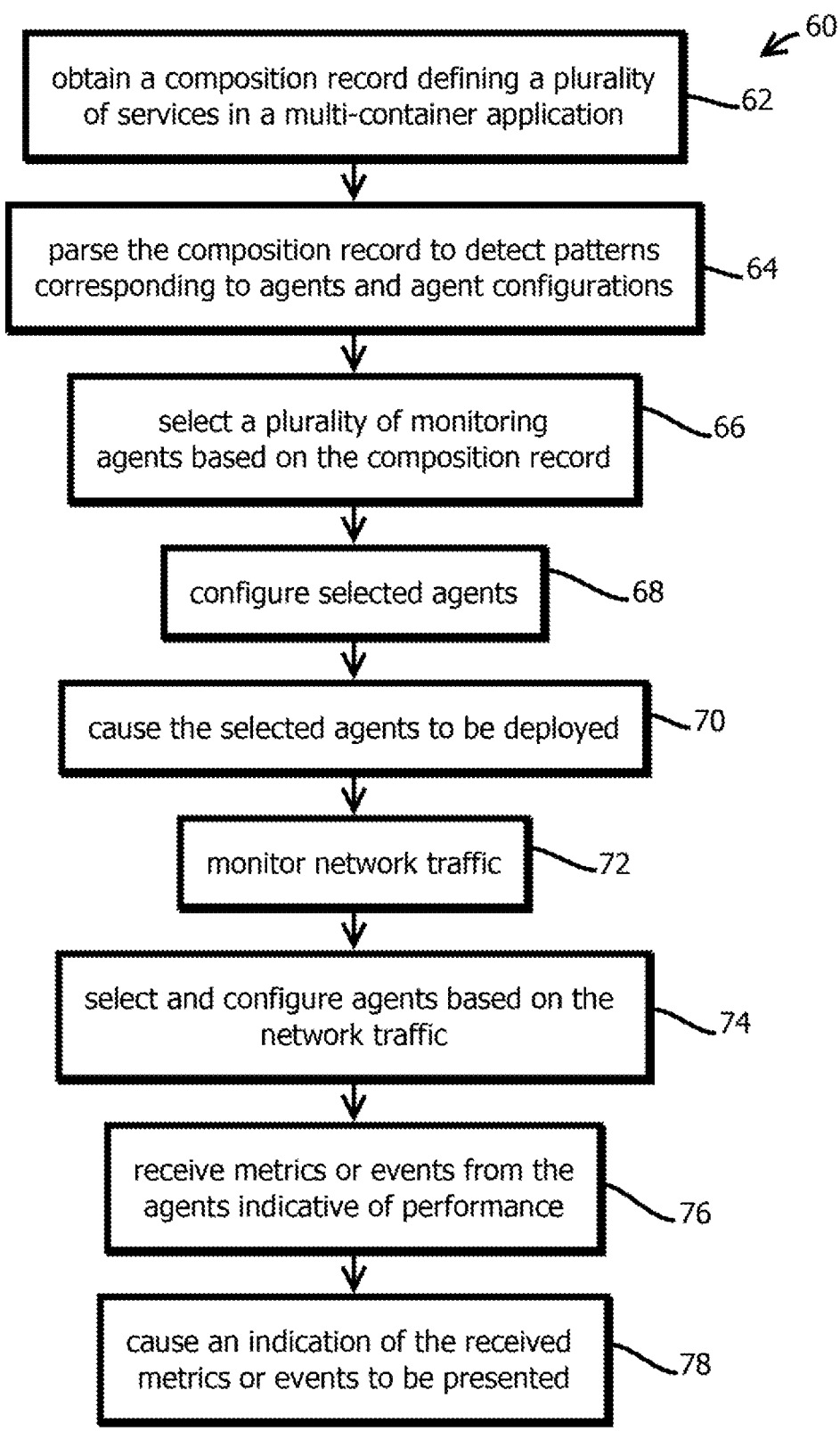
FIG. 2 shows an example of a process by which monitoring is configured and deployed in accordance with some embodiments based on a configuration file for a multi-container application.
Figure 3:
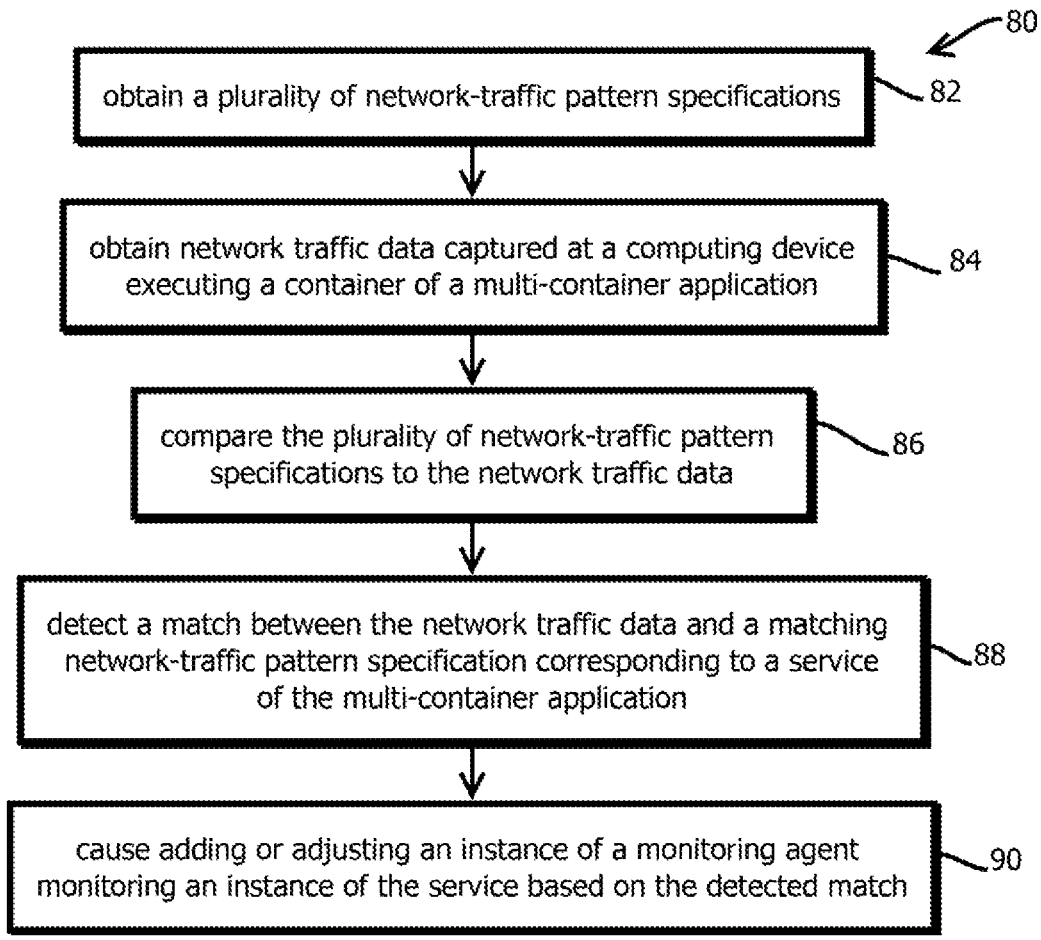
FIG. 3 shows an example of a process by which monitoring is adjusted based on observed network traffic in accordance with some embodiments.

In some embodiments, the process of FIG. 2 may be executed by the above-described monitoring configurator 12, but embodiments are not limited to that implementation, which is not to imply that any other feature is limited to the described implementation. In some embodiments, multiple instances of the process 60 may be executed concurrently, for instance, on different Compose files, in relation to different multi-container applications. In some embodiments, the operations described (in reference to this and the other figures) may be performed in a different order from that recited, in some cases with some operations replicated multiple times, again which is not to imply that other descriptions are limiting.

Some embodiments include obtaining a composition record defining a plurality of services in a multi-container application, as indicated by block 62. In some cases, the composition record may be a Docker Compose™ file or one of the other examples described above. Obtaining may include retrieving the composition file in the form of a human readable hierarchical serialization data format text file, or the composition record may be obtained in a different format, for instance, upon parsing such a file and loading the attributes thereof into a data structure in memory, like a set of objects in an object-oriented programming environment.

Next, some embodiments may parse the composition record to detect patterns corresponding to agents and agent configurations, as indicated by block 64. Some embodiments may access the various rules described above to detect such patterns and compare those rules to the information contained in the composition record. Some embodiments may detect patterns corresponding to a plurality of agents and some embodiments may detect a plurality of patterns corresponding to individual ones of the agents. Some embodiments may further detect the absence of patterns in the composition record corresponding to agents.

Next, some embodiments may select a plurality of monitoring agents based on the composition record, as indicated by block 66. In some embodiments, the selection may be based upon a single rule, such as a single pattern being detected or in some cases, a combination of patterns being detected may cause a given agent to be selected. This may include detecting the absence of a pattern. In some embodiments, as noted above, the selection may be based on a weighted combination of scores corresponding to a plurality of different patterns and a comparison of the weighted combination to a threshold, with agents exceeding the threshold being selected.

Some embodiments may further configure selected agents, as indicated by block 68. In some cases, a plurality of different candidate configurations may be stored in memory, such as predefined configurations or formulas by which values in configurations or calculated. Some embodiments may determine configurations based on information in the composition record, for instance, based on parsing the composition record to detect patterns corresponding to the candidate configurations, using techniques like those described above to select agents.

Some embodiments may cause the selected agents to be deployed, as indicated by block 70. In some cases, this may include causing the agents to be deployed with the configuration determined in block 68. In some embodiments, this operation may further include deploying the selected agents, or those agents may be deployed by another system to which a command is sent to cause the deployment.

Some embodiments may further monitor network traffic, as indicated by block 72, and select or configure agents based on the network traffic, as indicated by block 74. In some embodiments, these two operations may include performing the process described below with reference to FIG. 3. Some embodiments may detect agents or agent configurations not indicated or not readily inferred from the composition record based on network behavior of the services in the monitored multi-container application with these operations.

Some embodiments may receive metrics or events from the agents indicative of performance, as indicated by block 76. For example, some embodiments in which the monitoring configurator 12 is integrated with the application monitor 16 may include this in the next operation. Thus, in some cases, metrics and events may be received from a plurality of different computing devices, indicating operation attributes of a plurality different containers executing a plurality different application components. In some embodiments, such events and metrics may be received for a plurality of different multi-container applications, in some cases concurrently.

Some embodiments may further cause an indication of the received metrics or events to be presented to a user, as indicated by block 78. This operation may include sending an instruction to a remote client device that causes that remote client device to present a dashboard having graphs indicative of metrics and tables listing events, such as alarms. In some cases, this operation 78 may include causing a computing device upon which the application monitor 16 operates to present the events or metrics on a display of that computing device. This operation 78 may include sending a message to an address of a user, such as an email message, or an SMS text message to a phone number, or the like. Some embodiments may access a policy mapping types of events or metrics to roles and mapping roles to types of communication (e.g., email or text message) and to addresses (e.g., indicating which phone number or email address to use based on which shift is operating according to the current time of day).

As noted, some embodiments may add or remove agents or change agent configurations based on observations of network traffic. In some embodiments, the network traffic is observed at the computing device executing the multi-container application components subject to potential monitoring or adjusted monitoring rather than at a router or other network node. Monitoring outside of the computing devices 14 may be difficult in certain computing environments, like public cloud data centers, where available API's do not provide these capabilities (though embodiments are consistent with monitoring at a router or network switch in some cases). In some embodiments, some or all of the process 80 may be performed on different computing devices, for instance, with patterns being detected on a computing device being monitored or potentially monitored and agents being selected based on those patterns on a different computing device, like the monitoring configurator 12 described above, responsive to pattern matches being sent to the monitoring configurator 12 by the respective computing device 14. Or in some embodiments, network traffic may be sent to the monitoring configurator 12 described above. In some embodiments, the entire process 80 may be performed on a computing device potentially subject to monitoring.

In some embodiments, the process 80 includes obtaining a plurality of network-traffic pattern specifications, as indicated by block 82. In some embodiments, the specifications each correspond to an agent or an agent configuration. Upon a corresponding pattern being detected, the agent or respective agent configuration may be applied in response, as described below.

In some embodiments, the pattern specifications may specify patterns in various portions of network traffic. In some embodiments, the patterns pertain to (and thus specify attributes of corresponding to a match) network layer, transport layer, or application layer portions of network traffic. In some embodiments, the patterns pertain to headers, like send or receive addresses therein, like IP addresses or port numbers. In some embodiments, the patterns pertain to protocol selections like use of IP version 4 or IP version 6 or transport control protocol versions or application layer versions or protocols. In some embodiments, the patterns pertain to payloads of network-traffic packets, like payloads of Ethernet packets, containing information sent by application-layer communications. In some embodiments, the patterns specify strings, for example, with regular expressions or dictionaries, within payloads. In some embodiments, the patterns specify statistical attributes, like ratios of occurrences of strings, frequencies of pairs of strings (either as a function of time or as a function of content, like on instance of a string per 50 payloads), or the like. In some embodiments, the patterns specify encoding of payloads, for example, patterns indicating encryption, like greater than a threshold entropy being exhibited by payload content, or messages establishing an encrypted session, like a transport layer security encrypted session. In some embodiments, the patterns specify temporal aspects of the network traffic, like attributes of a Fourier analysis of network traffic. In some cases, the patterns specify a pattern in to-from message pairs, like that a given container communicates with between five and seven other containers. In some embodiments, the patterns combine these various signals. In some embodiments, the pattern specifications are encoded in a trained and supervised machine learning classifier configured to classify network traffic based on a training set in which labeled network traffic associated with known services serves as a training set. In some cases, a deep packet inspection engine, like Snort, may be used to detect the patterns.

The pattern specifications are best understood in view of examples. In some embodiments, a given pattern may specify that port number 11371 corresponds to an agent configured to monitor an encryption key server. Some embodiments may observe network traffic containing in a header of a transport control protocol packet a recipient address including this port number and infer that the corresponding container to which the network traffic is directed is executing an encryption key server. In response, the corresponding agent may be added to that container.

In another example, a given pattern may specify that the string "name node (" occurs within a payload of an inbound packet. In some embodiments, this pattern may correspond to a name node within the Hadoop™ file system, and some embodiments may infer that a container to which the inbound packet is directed is executing an instance of a name node in such a file system. Some embodiments may add an agent configured to monitor a name node to the container.

In another example, a given pattern may specify that a second packet between a source and destination address pair is sent between 50 and 55 ms after a first packet between the source and destination address pair and that a third packet between the same source and address pair is sent between 120 and 150 ms after the second packet. This timing may correspond to a request response acknowledgment exchange in an application layer protocol of a given application, like a Redis pub/sub exchange, and some embodiments may infer that a container at one of the addresses is executing a corresponding application component, warranting a corresponding agent or agent configuration. In some cases, timing approaches may facilitate classification of encrypted traffic.

In another example, a given pattern may specify that a given payload be sent in identical form, regardless of the contents of the payload, thereby accommodating some encrypted payloads, to greater than a threshold number of recipients within a threshold duration of time, thereby potentially indicating a particular type of network communication associated with a particular type of application, for example, one in which data is replicated across three recipient devices in a redundant storage protocol. Some embodiments may infer the protocol and corresponding application based on this pattern.

Some embodiments include obtaining network traffic data captured at a computing device executing a container of a multi-container application, as indicated by block 84. In some embodiments, the network traffic data may be captured at various stages of a pipeline through the computing device by which applications cause messages to be sent or received messages from a network interface, like an Ethernet network interface. In some embodiments, the network traffic data may be captured at a first-in-first-out buffer of the network interface, at system memory from which firmware of the network interface retrieves messages to be sent through direct memory access (e.g., without accessing system memory via a memory controller of the processor), at system memory to which firmware of the network interface writes received network traffic through direct memory access (DMA), at system memory allocated to a driver configured to read or write to the DMA access area system memory, or via an interface between the kernel and the driver. In some embodiments, the obtained network traffic is obtained by executing a tcpdump command on a computing device executing one of the containers in the multi-container application that is potentially subject to monitoring or modified monitoring. In some embodiments, the command may cause a packet capture (pcap) file to be created responsive to the command. In some embodiments, the packet capture file may include timestamps of TCP packets, sender Internet protocol addresses and port numbers, recipient Internet protocol addresses and port numbers, and payloads. Some embodiments may sample network traffic, for example periodically, like once per minute for one second, or some embodiments may capture network traffic comprehensively.

Some embodiments may compare the plurality of network-traffic pattern specifications to the network traffic data, as indicated by block 86. In some embodiments, this may include segmenting the network traffic data by container, for instance, in a computing device having multiple containers sharing a network interface. In some embodiments, segmentation may be achieved by accessing a network address translation table of a reverse proxy executing on the computing device to identify virtual networking addresses corresponding the containers and corresponding mappings to external networking addresses reflected in the network traffic data.

Some embodiments may then separately compare each segmented group of network traffic data corresponding to respective containers to each of the network-traffic pattern specifications. Thus, the same network-traffic pattern specification may be compared to multiple segments of the network traffic data, as different services corresponded different patterns in different agents or agent configurations may be executed on the different containers. In some embodiments, the different segments may be compared concurrently, for example, in multiple threads on multiple cores of a processor to expedite the comparison.

Some embodiments may detect a match between the network traffic data and a matching network-traffic pattern specification corresponding to a service of the multi-container application, as indicated by block 88. In some embodiments, the match may be a deterministic one-to-one match between a single network-traffic pattern specification and a segment of the network traffic data. In some embodiments, the match may be a statistical match, for instance, indicating that a given service is executing with a greater than a threshold probability on a given computing device given that a plurality of patterns indicative of that service having been detected. In some cases, each pattern may have a corresponding probability associated with each of the agents or candidate services, and some embodiments may sum these probabilities to determine cumulative probabilities across a plurality of matches. For instance, pattern A may indicate a 5% probability that a given agent is warranted and pattern B may indicate an 87% probability that the same agent is warranted. Upon both patterns A and B matching to the network traffic in a segment, some embodiments may determine that the cumulative probability exceeds a 90% threshold and add the given agent.

Or as noted above, in some embodiments, detecting a match may include detecting a match with the trained network traffic classifier or based on hand coded rules or some combination thereof. Output classifications of such trained machine learning classifiers may be selections of agents. For instance, a decision tree classifier may be trained on a labeled training set of historical network traffic, with the labels indicating known instances of services emitting or receiving the traffic. Some embodiments may recursively split the training set based on values of respective dimensions of the training set that minimize (in a current iterations) an aggregate amount of miss-prediction by the current iteration of the decision tree. In some cases, the decision tree may be trained with the Classification and Regression Tree (CART) or Globally-optimal classification tree analysis (GO-CTA) algorithms.

In another example, a neural network may be trained based on a labeled training set of historical network traffic. Some embodiments may train the model by selecting weights for the neural network (e.g., randomly) and then iteratively adjusting the weights in a direction that tends to locally reduce an aggregate amount of miss-prediction by the current version of the model in training relative to the training set. Some embodiments may repeat this process until changes in aggregate amount of error between iterations are less than a threshold amount or a threshold amount of iterations have been performed.

Next, some embodiments may cause adding or adjusting an instance of a monitoring agent for an instance of the service for which a match was detected based on the detected match, as indicated by block 90. In some embodiments, this may include the operations described above with reference to block 70 and 68. Thus, some embodiments may add or configure monitoring without user intervention even in cases in which a composition file does not identify services to be monitored.

Figure 4:
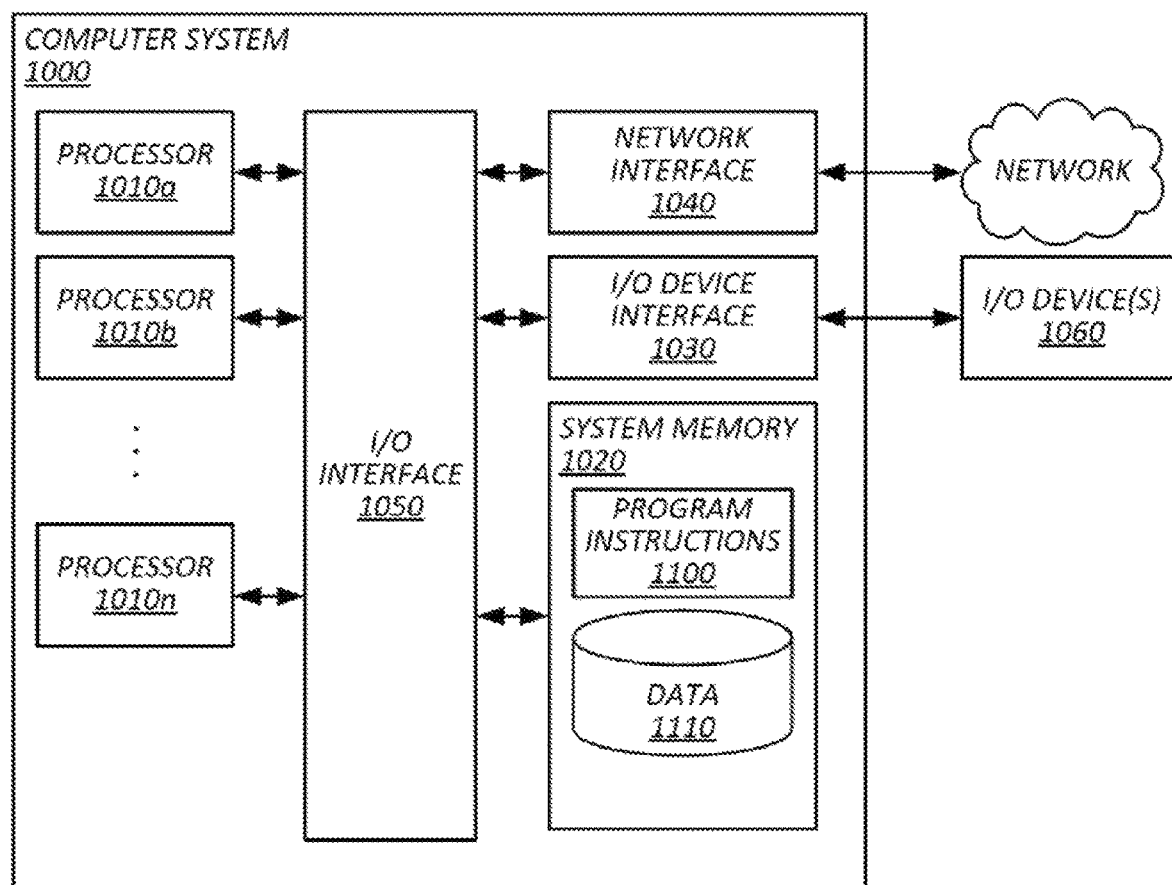
FIG. 4 shows an example of a computing device by which the above systems and processes may be implemented.

FIG. 4 is a diagram that illustrates an exemplary computing system (also referred to as a computing device or computer) 1000 in accordance with embodiments of the present technique. Various portions of systems and methods described herein, may include or be executed on one or more computer systems similar to computing system 1000. Further, processes and modules described herein may be executed by one or more processing systems similar to that of computing system 1000.

Computing system 1000 may include one or more processors (e.g., processors 1010a-1010n) coupled to system memory 1020, an input/output I/O device interface 1030, and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1020). Computing system 1000 may be a uni-processor system including one processor (e.g., processor 1010a), or a multi-processor system including any number of suitable processors (e.g., 1010a-1010n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 1000 may include a plurality of computing devices (e.g., distributed computer systems) to implement various processing functions.

I/O device interface 1030 may provide an interface for connection of one or more I/O devices 1060 to computer system 1000. I/O devices may include devices that receive input (e.g., from a user) or output information (e.g., to a user). I/O devices 1060 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computer system 1000 via a network and network interface 1040.

Network interface 1040 may include a network adapter that provides for connection of computer system 1000 to a network. Network interface may 1040 may facilitate data exchange between computer system 1000 and other devices connected to the network. Network interface 1040 may support wired or wireless communication. The network may include an electronic communication network, such as the Internet, a local area network (LAN), a wide area network (WAN), a cellular communications network, or the like.

System memory 1020 may be configured to store program instructions 1100 or data 1110. Program instructions 1100 may be executable by a processor (e.g., one or more of processors 1010a-1010n) to implement one or more embodiments of the present techniques. Instructions 1100 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory computer readable storage medium may include a machine-readable storage device, a machine-readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium that may have program instructions stored thereon that are executable by a computer processor (e.g., one or more of processors 1010a-1010-n) to cause the subject matter and the functional operations described herein. A memory (e.g., system memory 1020) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times, e.g., a copy may be created by writing program code to a first-in-first-out buffer in a network interface, where some of the instructions are pushed out of the buffer before other portions of the instructions are written to the buffer, with all of the instructions residing in memory on the buffer, just not all at the same time.

I/O interface 1050 may be configured to coordinate I/O traffic between processors 1010a-1010n, system memory 1020, network interface 1040, I/O devices 1060, and/or other peripheral devices. I/O interface 1050 may perform protocol, timing, or other data transformations to convert data signals from one component (e.g., system memory 1020) into a format suitable for use by another component (e.g., processors 1010a-1010n). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000 or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices or software that may perform or otherwise provide for the performance of the techniques described herein. For example, computer system 1000 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present techniques may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device.

In this patent, certain U.S. patents, U.S. patent applications, or other materials (e.g., articles) have been incorporated by reference. The text of such U.S. patents, U.S. patent applications, and other materials is, however, only incorporated by reference to the extent that no conflict exists between such material and the statements and drawings set forth herein. In the event of such conflict, the text of the present document governs.

The present techniques will be better understood with reference to the following enumerated embodiments:

1. A tangible, non-transitory, machine-readable medium storing instructions that when executed by one or more processors effectuate operations comprising: obtaining, with one or more processors, a composition record defining at least one service of a multi-container application, wherein: the multi-container application comprises a plurality of containers configured to run in one or more instances of a container engine executing on one or more computing devices, the containers each contain a respective application component of the multi-container application and respective dependencies of the respective application component, the composition record specifies a respective image identifier or build file-system-path of respective application components that, when executed, implement respective services of the multi-container application, selecting, with one or more processors, a plurality of infrastructure or application performance monitoring agents based on the composition record defining the multi-container application; causing, with one or more processors, the selected agents to be deployed on one or more computing devices executing the multi-container application; receiving, with one or more processors, metrics or events from the agents indicative of performance of at least part of the multi-container application or at least some of the one or more computing devices executing the multi-container application; and causing, with one or more processors, an indication of the received metrics or events to be presented.

2. The medium of embodiment 1, wherein: a kernel of an operating system of at least one of the one or more computing devices executing the multi-container application executes a plurality of the containers in respective user-space instances isolated from one another; the composition record is a compose file stored in persistent memory and encoded in a human-readable data serialization language; the multi-container application comprises more than three containers corresponding to more than three difference services in a service-oriented logical architecture of the multi-container application; selecting a plurality of agents comprises selecting a plurality of agents based on respective tokens corresponding to the selected agents parsed from the compose file; causing the selected agents to be deployed comprises causing at least a plurality of the selected agents to be deployed in a monitoring container configured to monitor performance of other containers in the multi-container application; the dependencies include a version of a library called by at least one application component and a version of a framework that calls at least one application component; and the metric or events indicate an amount of a storage volume used or amounts of reads from or writes to a storage volume.

3. The medium of any one of embodiments 1-2, wherein: selecting the plurality of infrastructure or application performance monitoring agents comprises selecting an agent based on a network port number specified by the composition record.

4. The medium of embodiment 3, wherein the operations comprise: parsing the composition record to detect a pattern including a key indicative of a port specification, a colon indicating a pairing of the key with a value, and a value comprising a sequence of network port numbers delimited by a delimiter character; splitting a string including the sequence of network port numbers according to the delimiter character to form an array; and iterating through the array and comparing items in the array to records in a mapping between network port numbers and types of agents.

5. The medium of any one of embodiments 1-4, comprising: parsing the composition record; detecting a token in the composition record; determining that the token corresponds to a service; and determining that the service corresponds to a service-specific agent, wherein: selecting the plurality of infrastructure or application performance monitoring agents comprises selecting the service-specific agent.

6. The medium of any one of embodiments 1-5, comprising: identifying a provider of a given container of the multi-container application based on the composition record, wherein: at least some of the selected agents are selected based on the identified provider.

7. The medium of embodiment 6, wherein: the at least one of the selected agents is selected based on the identified provider, an identifier of the given container in the composition record, and a network port number listed in the composition record.

8. The medium of any one of embodiments 1-7, wherein causing the selected agents to be deployed comprises adding an image identifier of a container image that includes the selected agent to the composition record.

9. The medium of any one of embodiments 1-8, wherein the selected agents include an infrastructure agent configured to obtain metrics of one of the one or more computing devices executing the multi-container application, the metrics including an amount of processor utilization.

10. The medium of any one of embodiments 1-9, wherein the selected agents include an application performance monitor agent configured to obtain run-times of one or more routines of one of the application components, the run-times each corresponding to a duration of time a routine takes to service a portion of a transaction serviced by a plurality of routines.

11. The medium of any one of embodiments 1-11, wherein: a given one of the selected agents is configured to monitor a corresponding container of the multi-container application via a Java Management Extension interface without the given one of the selected agents executing in a shared user-space instance with the corresponding container.

12. The medium of any one of embodiments 1-11, comprising: adjusting configurations of one or more agents based on the composition record, wherein adjusting configurations comprises: changing a metric monitored; changing a threshold for an alarm; and determining an interface by which information is ingested by a selected agent.

13. The medium of any one of embodiments 1-12, comprising: accessing, with a given agent, a packet sent or received by a given container of the multi-container application; adjusting a configuration of the given agent based on the packet.

14. The medium of any one of embodiments 1-13, comprising: accessing, with a given agent, a packet sent or received by a given container of the multi-container application by reading a value from a network interface buffer either on the buffer or in system memory allocated to a driver of the network interface; and adding another agent to monitor the multi-container application based on the packet.

15. The medium of any one of embodiments 1-14, wherein: selecting a plurality of infrastructure or application performance monitoring agents comprises steps for selecting agents.

16. The medium of any one of embodiments 1-15, comprising: orchestrating the multi-container application with a platform agnostic orchestration application.

17. The medium of any one of embodiments 1-16, wherein: the composition record is a Docker-standard compliant compose file or a Kubernetes-standard compliant manifest.

19. A method, comprising: the operations of any one of embodiments 1-17.

20. A system, comprising: one or more processors; and memory storing instructions that when executed by the processors cause the processors to effectuate operations comprising: the operations of any one of embodiments 1-17.

What is claimed is:

1. A tangible, non-transitory, machine-readable medium storing instructions that when executed by one or more processors effectuate operations comprising:
   obtaining, with one or more processors, an inventory of at least some containers of a multi-container application, wherein:
      the multi-container application comprises a plurality of containers configured to run in one or more instances of a container engine executing on one or more computing devices,
      the containers each contain a respective application component of the multi-container application and respective dependencies of the respective application component,
      entries in the inventory are associated with a respective image identifier or build file-system-path of respective application components that, when executed, implement respective services of the multi-container application,
   automatically selecting, with one or more processors, a plurality of infrastructure or application performance monitoring agents based on the inventory of containers of the multi-container application;
   causing, with one or more processors, the selected agents to be deployed on one or more computing devices executing the multi-container application;
   receiving, with one or more processors, metrics or events from the agents indicative of performance of at least part of the multi-container application or at least some of the one or more computing devices executing the multi-container application; and
   causing, with one or more processors, an indication of the received metrics or events to be presented.

2. The medium of claim 1, wherein:
   the inventory is an inventory of all containers of the multi-container application obtained from a composition record;
   a kernel of an operating system of at least one of the one or more computing devices executing the multi-container application executes a plurality of the containers in respective user-space instances isolated from one another;
   the composition record is a compose file stored in persistent memory and encoded in a human-readable data serialization language;
   the multi-container application comprises more than three containers corresponding to more than three difference services in a service-oriented logical architecture of the multi-container application;
   selecting a plurality of agents comprises selecting a plurality of agents based on respective tokens corresponding to the selected agents parsed from the compose file;
   causing the selected agents to be deployed comprises causing at least a plurality of the selected agents to be deployed in a monitoring container configured to monitor performance of other containers in the multi-container application;
   the dependencies include a version of a library called by at least one application component and a version of a framework that calls at least one application component; and the metric or events indicate an amount of a storage volume used or amounts of reads from or writes to a storage volume.

3. The medium of claim 1, wherein:
selecting the plurality of infrastructure or application performance monitoring agents comprises selecting an agent based on a network port number associated with an entry in the inventory.

4. The medium of claim 3, wherein the operations comprise:
parsing the composition record to detect a pattern including a key indicative of a port specification, a colon indicating a pairing of the key with a value, and a value comprising a sequence of network port numbers delimited by a delimiter character;
splitting a string including the sequence of network port numbers according to the delimiter character to form an array; and
iterating through the array and comparing items in the array to records in a mapping between network port numbers and types of agents.

5. The medium of claim 1, comprising:
parsing an entry of the inventory;
detecting a token in the entry of the inventory;
determining that the token corresponds to a service; and
determining that the service corresponds to a service-specific agent, wherein:
selecting the plurality of infrastructure or application performance monitoring agents comprises selecting the service-specific agent.

6. The medium of claim 1, comprising:
identifying a provider of a given container of the multi-container application based on the inventory, wherein:
at least some of the selected agents are selected based on the identified provider.

7. The medium of 6, wherein:
the at least one of the selected agents is selected based on the identified provider, an identifier of the given container in the inventory, and a network port number listed in the inventory.

8. The medium of claim 1, wherein causing the selected agents to be deployed comprises adding an image identifier of a container image that includes the selected agent to the inventory.

9. The medium of claim 1, wherein the selected agents include an infrastructure agent configured to obtain metrics of one of the one or more computing devices executing the multi-container application, the metrics including an amount of processor utilization.

10. The medium of claim 1, wherein the selected agents include an application performance monitor agent configured to obtain run-times of one or more routines of one of the application components, the run-times each corresponding to a during of time a routine takes to service a portion of a transaction serviced by a plurality of routines.

11. The medium of claim 1, wherein:
a given one of the selected agents is configured to monitor a corresponding container of the multi-container application via a Java Management Extension interface without the given one of the selected agents executing in a shared user-space instance with the corresponding container.

12. The medium of claim 1, comprising:
adjusting configurations of one or more agents based on the inventory, wherein adjusting configurations comprises:
changing a metric monitored;
changing a threshold for an alarm; and
determining an interface by which information is ingested by a selected agent.

13. The medium of claim 1, comprising:
accessing, with a given agent, a packet sent or received by a given container of the multi-container application;
adjusting a configuration of the given agent based on the packet.

14. The medium of claim 1, comprising:
accessing, with a given agent, a packet sent or received by a given container of the multi-container application by reading a value from a network interface buffer either on the buffer or in system memory allocated to a driver of the network interface; and
adding another agent to monitor the multi-container application based on the packet.

15. The medium of claim 1, wherein:
selecting a plurality of infrastructure or application performance monitoring agents comprises steps for selecting agents.

16. The medium of claim 1, comprising:
orchestrating the multi-container application with a platform agnostic orchestration application.

17. The medium of claim 1, wherein:
the inventory is based on a Docker-standard compliant compose file or a Kubernetes-standard compliant manifest.

18. A method comprising:
obtaining, with one or more processors, an inventory of at least some containers of a multi-container application, wherein:
the multi-container application comprises a plurality of containers configured to run in one or more instances of a container engine executing on one or more computing devices,
the containers each contain a respective application component of the multi-container application and respective dependencies of the respective application component,
entries in the inventory are associated with a respective image identifier or build file-system-path of respective application components that, when executed, implement respective services of the multi-container application,
automatically selecting, with one or more processors, a plurality of infrastructure or application performance monitoring agents based on the inventory of containers of the multi-container application;
causing, with one or more processors, the selected agents to be deployed on one or more computing devices executing the multi-container application;
receiving, with one or more processors, metrics or events from the agents indicative of performance of at least part of the multi-container application or at least some of the one or more computing devices executing the multi-container application; and
causing, with one or more processors, an indication of the received metrics or events to be presented.

19. The method of claim 18, comprising:
identifying a provider of a given container of the multi-container application based on the inventory, wherein:
at least some of the selected agents are selected based on the identified provider, and
selecting the plurality of infrastructure or application performance monitoring agents comprises selecting an agent based on a network port number associated with an entry of the inventory.

20. The method of claim 18, comprising:
obtaining the inventory from a composition record by:
  parsing the composition record; and
  detecting a token in the composition record;
determining that the token corresponds to a service; and
determining that the service corresponds to a service-specific agent, wherein:
  selecting the plurality of infrastructure or application performance monitoring agents comprises selecting the service-specific agent.

* * * * *